Patented July 8, 1952

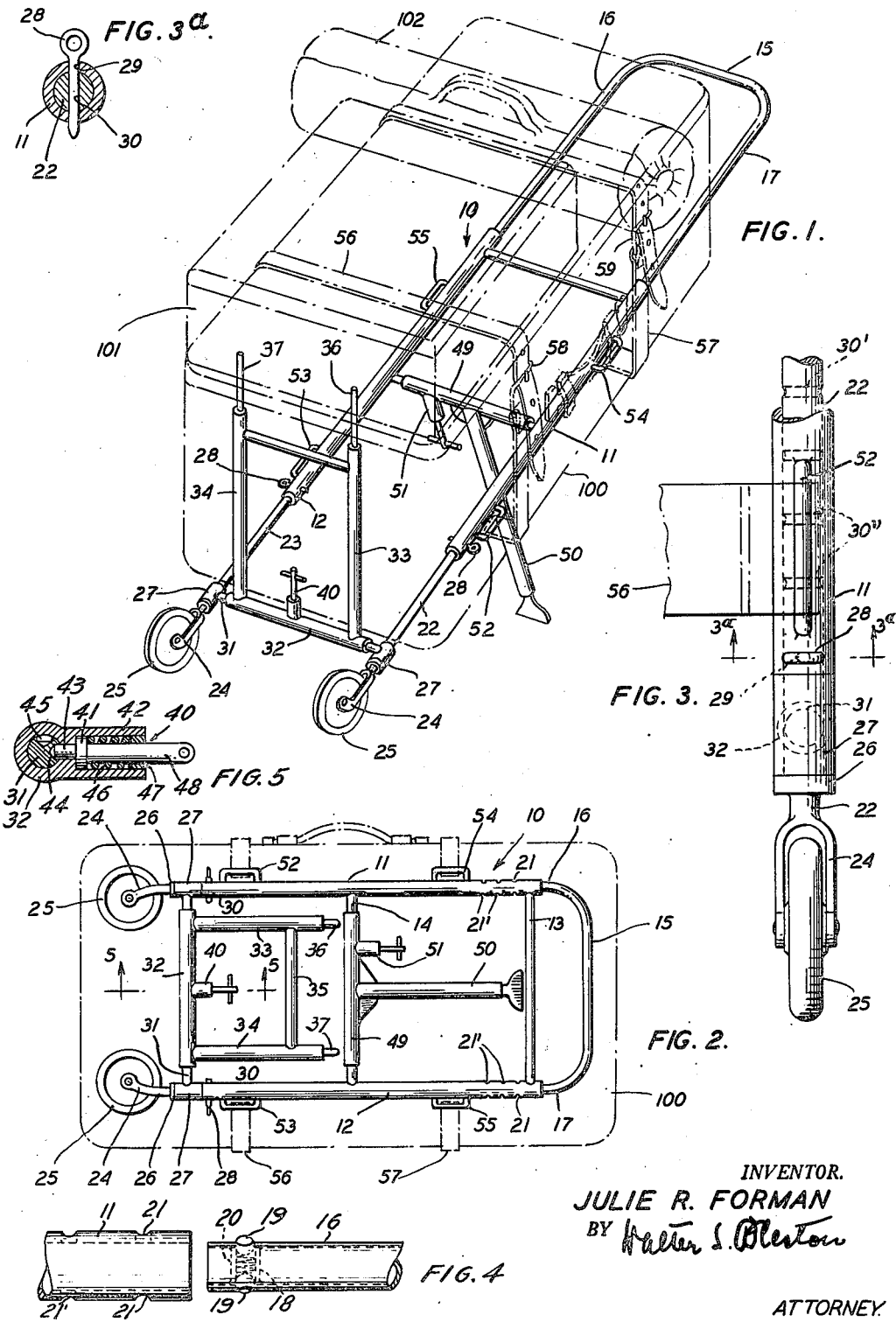

2,602,675

UNITED STATES PATENT OFFICE 2,602,675

COLLAPSIBLE LUGGAGE CARRIER

Julie R. Forman, Litchfield, Conn.

Application March 8, 1950, Serial No. 148,461

2 Claims. (Cl. 280—36)

The present invention relates to a collapsible luggage carrier or dolly, and aims primarily to provide a means which may be attached to a piece of luggage, and which, regardless whether or not attached to such piece may be erected so as to be serviceable as a wheeled carrier, or may be collapsed into a structure requiring little space. Another object of the invention is to provide a carrier or dolly of the mentioned type which may be collapsed into a substantially plane structure of a thickness not, or not materially, exceeding that of its thickest member, and of a length not, or not materially, exceeding that of the carrying area of the dolly.

The invention essentially consists of a plane frame, having a substantially rectangular carrying area with supporting wheels adapted to be turned substantially into the frame plane when not in use, a projectable handle, and means for detachably securing said frame to a piece of luggage.

The invention also aims to provide in a collapsible carrier or dolly of the mentioned type, a rear structure or back frame which may be selectively turned into an erected position or into a position substantially flush with the main frame.

Further objects and details of the invention will be apparent from the description given hereinafter and the accompanying drawing illustrating two embodiments thereof by way of example. In the drawing, Fig. 1 is a perspective view of a luggage carrier or dolly according to my invention, in its open state and attached to a piece of luggage;

Fig. 2 is a bottom plan view thereof in its collapsed state;

Fig. 3 is a side elevation of a part thereof at a larger scale;

Fig. 3a is a section along line 3a—3a in Fig. 3;

Fig. 4 is a side elevation of another part; and

Fig. 5 is a cross-section along line 5—5 of Fig. 2.

Referring now to the drawing, the luggage carrier shown in Figs. 1 to 5 comprises a frame in general denoted by 10. As best seen in Fig. 2, the frame consists of two longitudinal members 11 and 12, respectively, which are connected, e. g., through welding, by a transverse member 13 near their front ends and by another transverse member 14 intermediate their ends. Preferably, the mentioned four members or at least the longitudinals are of tubular cross-section, but depending on the structure of the additional members other cross-sections may be selected with similar advantage.

A piece of round cross-section is bent into U-shape to form a handle 15 with legs 16 and 17 which are telescopically shiftable in the longitudinals 11 and 12, respectively. The legs 16 and 17 are provided, near their ends, with detent means to hold the handle releasably in the extended position. A detent means of a kind useful for that purpose is shown in Fig. 4 where the end of the leg 16 is provided with an interior transverse tube 18 which houses two little ball pieces 19 urged outwardly by a spring 20. The end of the associated longitudinal 11 has in its wall two opposite holes 21 in which the balls can engage. The balls can be sufficiently compressed from the outside to permit the leg to be pushed inwards with respect to the longitudinal. Furthermore, in order to render the dolly better useful for pieces of luggage of different lengths, the total length of the erected dolly may be adjustable. For this purpose, additional sets of holes 21' may be provided in the longitudinals 11 and 12, to be selectively engaged by the balls 19 depending upon the distance it is desired to have the handle project in each case.

In the other ends of the longitudinals 11 and 12 two other tubes or rods 22 and 23, respectively, are telescopically shiftable. As best seen in Fig. 3 each of those rods forms a fork 24 at its outer end in which a wheel 25 is journaled. Detent means are provided to hold the rods in retracted position with the associated wheels in the plane of the frame 10, or alternately in the extended position with the wheels at right angles to the plane of the frame. Such detent means may be of the type of Fig. 4 or of any other suitable and conventional type. In the example of Figs. 3 and 3a, the detent for the indicated purpose consists of a pin 28 inserted through a transverse bore 29 of the longitudinal 11 and engaging a registering bore 30 of the rod 22 when the latter is retracted. In order to project rod 22, the pin 28 may be withdrawn; then the rod may be pulled out and turned 90 degrees. In order to hold the rod in its extended position, the pin will be inserted again when another hole 30' is brought to register with bore 29. In this connection it will be noted that the direction of the hole 30' is at right angles to the hole 30. Furthermore other holes 30'' may be provided between holes 30 and 30' and parallel to 30' in order to allow for an adjustment of the distance the wheel 25 projects from the end of the longitudinal 11. The detent arrangement in connection with the other longitudinal 12 may be similar to that just described. Thus, the mentioned adjustability as well as the adjustability of the handle renders the length of the dolly adaptable to differently sized pieces of luggage. Adjacent the fork 24 a collar 26 is provided on each of the rods, and a sleeve 27 is mounted on each of the rods between its collar 26 and the associated longitudinal. The sleeves 27 are connected by a transverse rod 31 on which a tube 32 is rotatably mounted. Two parallel, preferably also tubular, members 33 and 34 are secured to the tube 32 near its ends and are connected to each other by a transverse member 35. The members 33, 34 and 35 constitute the rear frame of the dolly, when erected. If so desired, the members 33 and 34 may be provided with extensions 36 and 37, respectively, telescopically fitting into the associated members.

A latch 40 is provided in order to hold the rear frame, selectively, in its collapsed or in its erected position. The latch, more clearly shown in Fig. 5 comprises a plunger 41 shiftable in a cylindrical projection 42 of the tube 32. The plunger has a pin-like extension 43 which may be brought into engagement with a bore 44 of rod 31 when the frame is collapsed or with a bore 45 when the frame is erected. A spring 46 bearing against the plunger and a closure 47 of the cylindrical extension tends to urge the plunger in an engaging position. The plunger is provided with a handle 48 so that it may be withdrawn from engaging position against the restraint of spring 46.

In many instances, it will be desirable to support the dolly with its handle raised from the ground. For this purpose a tube 49 may be mounted on the transverse member 14, and a foot 50 may be welded to that tube, so that the foot may be turned into the plane of the frame 10, or into a position in which it projects downwardly. When the foot is in the latter position, the dolly can rest on the wheels and the foot simultaneously. A latch 51 of a structure similar to that of latch 40 may be provided in order to hold the foot in the selected position.

Means are provided to attach the frame 10 detachably to a piece of luggage. Such means may be of any suitable type. In the illustrated embodiment the longitudinals 11 and 12 are provided for this purpose with loops or ears 52, 53, 54 and 55, so that e. g., straps 56 and 57 can be fastened thereto and tightened by buckles 58 and 59 around a suitcase 100 or similar piece of luggage. In many instances it will be desirable to extend the rear frame upwards beyond the dimension of the piece which comes to bear against it, so that the dolly can carry more than just that piece. For this purpose rods 36 and 37 may be arranged telescopically shiftable in the members 33 and 34, respectively.

When collapsed, i. e. in the relative position of the parts as shown in Fig. 2, all parts are located substantially in the plane of the longitudinals 11 and 12. In consequence, the collapsed dolly requires a minimum of space regardless whether it is detached for storing or whether it is attached to a piece of luggage such as suitcase 100. So attached, it may be easily lifted with the suitcase, and the suitcase with the attached carrier can be readily put on a luggage rack or wherever desired.

In order to use the carrier as a dolly, without detaching it from the suitcase, handle 15 may be pulled out until the detents of the legs engage the holes 21 or 21' of the longitudinals. After removal of the pins 28 from holding position, the rods 22 may be turned 90 degrees and the tube 32 may be gripped and pulled to the left side in Fig. 2 until a desired set of holes 30' or 30'' is in registry with the holes 29. Thereby, the wheels 25 and tube 32 come into their positions relatively to the suitcase 100, as shown in Fig. 1, but with the rear frame still underneath the suitcase. In order to be readily able to pull out the parts as described without loosening the straps, it is advisable not to exceed in any one of the parts the thickness of the longitudinals 11 and 12 on which the suitcase bears. When the rods 22 and 23 are secured in their extended position, the latch 40 may be pulled back and the rear frame may be turned about rod 31 through approximately 270 degrees until the latch engages again and holds the rear frame or back in the erected position. Similarly, latch 51 may be pulled back and the foot 50 may be turned down. When, finally, rods 36 and 37 are pulled out, they may serve as a rest for other pieces of luggage, such as the pieces 101 and 102, and the whole assembly may be wheeled to a place of destination where the dolly may be again collapsed.

Although I have described only one embodiment of my invention, it will be clear to those skilled in the art that many alterations and modifications are possible without departure from the essence and spirit of my invention which for that reason shall not be limited but by the scope of the appended claims.

I claim:

1. A collapsible luggage dolly comprising a substantially plane frame including two parallel longitudinal members and at least one transverse member, a handle structure, a pair of wheels, a wheels-supporting structure, and a back structure, said structures being connected to but movable in relation to said frame so as to be substantially in the plane of said frame when said dolly is collapsed, said wheels-supporting structure including for each wheel a fork having a shank in telescopical engagement with one of said longitudinal members, two sleeves, one on each of said shanks, a transverse element connected to said sleeves, and said back structure being rotatably mounted on said transverse element so as to be at approximately right angles to said plane when said dolly is erected.

2. A collapsible luggage dolly comprising a substantially plane frame including two parallel longitudinal members and at least one transverse member, a handle structure, a pair of wheels, a wheels-supporting structure, and a back structure, said structures being connected to, but movable in relation to said frame, so as to be substantially in the plane of said frame when said dolly is collapsed, and said wheels-supporting structure and said handle structure constituting extensions of the frame ends, respectively, substantially in its plane, said back structure including two parallel tubular members endwise rotatable about an axis transverse with respect to said longitudinal members to a position at approximately right angles to said plane when said dolly is erected, and rods in telescopical engagement with said tubular members and constituting an adjustable extension of the back structure in the direction of its height.

JULIE R. FORMAN.

REFERENCES CITED

The following references are of record in the file of this patent:

UNITED STATES PATENTS

| Number | Name | Date |
|---|---|---|
| 1,409,838 | Emery et al. | Mar. 14, 1922 |
| 2,243,312 | Fiala | May 27, 1941 |
| 2,401,986 | Talbott | June 11, 1946 |
| 2,419,422 | Schulein | Apr. 22, 1947 |
| 2,468,390 | Binz | Apr. 26, 1949 |
| 2,514,849 | Dewing | July 11, 1950 |

FOREIGN PATENTS

| Number | Country | Date |
|---|---|---|
| 593,391 | Great Britain | Oct. 15, 1947 |
| 621,153 | France | May 6, 1927 |